United States Patent

[11] 3,546,445

[72] Inventors Joseph R. Marchant
 Detroit;
 Vilho Koljonen, Warren, Michigan
[21] Appl. No. 772,635
[22] Filed Nov. 1, 1968
[45] Patented Dec. 8, 1970
[73] Assignee General Motors Corporation
 Detroit, Michigan
 a corporation of Delaware

[54] HEADLAMP ASSEMBLY
 4 Claims, 5 Drawing Figs.
[52] U.S. Cl. ........................................................ 240/41.6,
 240/44, 240/57
[51] Int. Cl. ........................................................ F21v 7/00
[50] Field of Search .......................................... 240/41.6,
 44, 57, 41.61, 41.62; 248/188.4, (Inquired)

[56] References Cited
 UNITED STATES PATENTS
2,911,522 11/1959 Mears ............................ 240/41.6

3,493,740 2/1970 Onksen ........................ 240/44X
Primary Examiner—John M. Horan
Assistant Examiner—Richard L. Moses
Attorneys—J. L. Carpenter and E. J. Biskup ABSTRACT: A headlamp assembly for a motor vehicle wherein a headlamp is universally adjustably supported on the vehicle by a pair of aiming screws and a pivot pin. The aiming screws are oppositely disposed with respect to the headlamp in a longitudinal plane inclined 45° from a transverse horizontal axis of the vehicle and the pivot pin is horizontally alined with one of the aiming screws and vertically alined with the other of the aiming screws. A compression spring serves to continuously bias the headlamp into engagement with the aiming screws and against the pivot pin. By selectively rotating one aiming screw, the headlamp is positioned about a vertical axis in a horizontal aiming plane and, by selectively rotating the other aiming screw, the headlamp is positioned about a horizontal axis in a vertical aiming plane.

PATENTED DEC 8 1970

3,546,445

INVENTORS.
Joseph R. Marchant, &
BY Vilho Koljonen

E. J. Biskup
ATTORNEY 3,546,445

HEADLAMP ASSEMBLY

Presently, major manufacturers of motor vehicle headlamp assemblies use the ball-and-socket type of headlamp mounting. This mounting typically includes a mounting ring having a spherical surface or ball universally adjustably supported in a socket formed on a housing that is adapted to be attached to the vehicle. A sealed beam headlamp is fixedly clamped to the mounting ring and is universally adjustable relative to the socket and the vehicle by means of two aiming screws and a tensioned compensating spring. One of the aiming screws is aligned with the vertical axis of the headlamp and serves to adjustably position the headlamp about the ball-and-socket connection in a vertical aiming plane. The other aiming screw is aligned with the horizontal axis of the headlamp and serves to adjustably position the headlamp about the ball-and-socket connection in a horizontal aiming plane. The compensating spring biases the spherical surface against the socket and the mounting ring against the heads of the aiming screws.

In certain instances, due to the large area of frictional engagement between the ball and the socket, problems may be encountered in obtaining and maintaining proper headlamp aim. For example, it has been found that binding may occur during aiming of the headlamp which causes the spherical surface to "lift off" the socket. Upon subsequent vibration or jarring, the compensating spring will cause the ball to reseat against the socket thereby shifting the headlamp and disturbing the headlamp aim. To minimize the frictional problems between the ball and the socket, it has been proposed to provide a number of circumferentially spaced bearing lands on the socket. While this modification reduces the frictional engagement and somewhat alleviates the binding problem, a lack of lubricant or corrosion at the contacting surfaces may prevent full relative rotation between the ball and socket that will result in "lift off" and misalignment of the type described above, and in addition, increase the resistance to aiming alignment. Inasmuch as proper headlamp aim is defined within narrow limits, it is desirable to provide an alignment system that is fully responsive to small adjustment increments. The ball-and-socket headlamp mounting without proper maintenance may not be altogether satisfactory in this respect.

The present invention contemplates overcoming the above-noted problems by providing a headlamp assembly wherein the headlamp is connected to the housing by a limited contact adjustable suspension. In the accomplishment of this objective, a conventional sealed beam headlamp is clamped between a retaining ring and an annular adjusting plate. A pair of aiming screws are adjustably connected between the adjusting plate and a housing. The aiming screws are diametrically opposed with respect to the headlamp and lie in a longitudinal plane that is inclined 45° with respect to a transverse horizontal axis of the housing. A pivot pin connected to the housing has a head portion that universally contacts the adjusting plate at a point horizontally aligned with one aiming screw and vertically aligned with the other aiming screw. A coiled spring compressively retained between the housing and the adjusting plate serves to continuously bias the latter against the heads of the aiming screws and the pivot pin to establish a three-point suspension system. In assembly, the housing is mounted in a vertical plane along the transverse horizontal axis of the vehicle and, by selectively rotating one of the aiming screws, the headlamp is positioned in a horizontal aiming plane by pivotal movement about a vertical axis defined by the other aiming screw and the pivot pin. By selectively rotating the other aiming screw, the headlamp is positioned in a vertical aiming plane by pivotal movement of the headlamp about a horizontal axis defined by the first aiming screw and the pivot pin. Therefore, the frictional engagement between the adjusting plate and the housing is substantially limited to the small head portions of the aforementioned elements. Additionally, the assembly has minimal resistance to relative movement between the headlamp and the housing to thereby facilitate easy headlamp aim and substantially eliminate the possibility of binding between the headlamp and the vehicle due to corrosion or lack of lubricant.

Accordingly, it is an object of the present invention to provide a motor vehicle headlamp assembly wherein a headlamp is universally adjustably connected to the vehicle by a three-point suspension and aiming system comprising a pair of aiming screws and a pivot pin.

Another object of the present invention is to provide a motor vehicle headlamp mounting wherein a headlamp is universally connected to the vehicle by a low-friction adjustable suspension comprising a first aiming screw, a pivot pin, a second aiming screw, and a spring which are circumferentially spaced with respect to the headlamp in successive quadrants, the arrangement being such that proper vertical and horizontal headlamp aim is established by selective rotation of the aiming screws.

It is another object of the present invention to provide a motor vehicle headlamp assembly having a low-friction three-point universally adjustable mounting wherein a headlamp is adjustably connected to the vehicle at the heads of a pair of aiming screws and a pivot pin. The aiming screws and the pivot pin are relatively positioned such that, by rotating one aiming screw the headlamp is pivoted relative to the vehicle about a horizontal axis between the other aiming screw and the pivot pin to establish vertical headlamp aim. By rotating the other screw, the headlamp is pivoted about a vertical axis between the first-mentioned aiming screw and the pivot pin to establish horizontal headlamp aim.

A further object of the present invention is to provide a headlamp assembly for a motor vehicle wherein an adjusting plate having a headlamp clamped thereto is universally adjustably supported relative to the vehicle by a pivot pin, a spring, and first and second aiming screws quadrantally spaced about the periphery of the headlamp. The aiming screws lie in a plane inclined substantially 45° with respect to a transverse horizontal axis of the vehicle and the pivot pin is horizontally aligned with the first aiming screw and horizontally aligned with the second screw such that rotating the first aiming screw pivots the adjusting plate and the headlamp about a vertical axis between the second aiming screw and the pivot pin to establish horizontal headlamp aim, and, rotating the second aiming screw pivots the adjusting plate and headlamp about a horizontal axis between the first aiming screw and the pivot pin to establish vertical headlamp aim.

These and other objects will be apparent to one skilled in the art upon reading the following detailed description, reference being made to the accompanying drawings in which.

Figures 1, 2, 3, 4, 5:
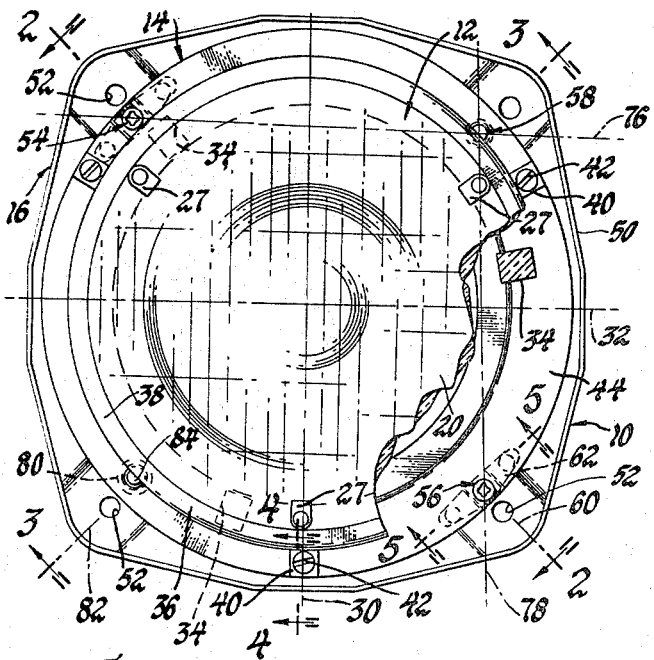
FIG. 1 is a partially sectioned front view of a motor vehicle headlamp assembly made in accordance with the present invention.
FIG. 2 is an enlarged view taken along line 2–2 of FIG. 1.
FIG. 3 is an enlarged view taken along line 3–3 of FIG. 1.
FIG. 4 is an enlarged view taken along line 4–4 of FIG. 1.
FIG. 5 is an enlarged view taken along line 5–5 of FIG. 1.

Referring to FIG. 1, a motor vehicle headlamp assembly 10 made in accordance with the present invention generally comprises a conventional sealed beam headlamp 12, an adjusting plate 14, and a mounting member or housing 16.

Referring to FIG. 2, the headlamp 12 comprises a reflector 18 having a lens 20 sealed thereto at mating peripheral flanges 22 and 24, respectively. As is conventional, the reflector 18 imparts directional control to the light rays emanating from a light source and the lens 20 imparts directional control to the light rays controlled by the reflector 18 to distribute illumination in a desired intensity pattern. For the single filament headlamp described herein, a pair of ferrules 25 and terminals 26 serve to connect the light source to a source of electrical power.

The headlamp 12, in assembly, is adjustably mounted on a vehicle to distribute illumination relative thereto in desired horizontal and vertical aiming planes. To facilitate proper positioning by means to be described in detail below, the lens 20 may include a plurality of circumferentially spaced reference elements 27 of the type disclosed in Arnold, U.S. Pat. No. 2,870,362 and assigned to the assignee of the present invention. Briefly, the reference elements 27 define an aiming plane 28 which, when positioned in a known plane relative to the motor vehicle, will direct illumination in a desired horizontal and vertical distribution relative to the vehicle. As the terms are hereafter applied and as illustrated in FIG. 1, proper horizontal headlamp aim is achieved when the aiming plane 28 is properly correctly positioned with respect to a vertical axis 30 and proper vertical headlamp aim is achieved when the aiming plane 28 is correctly positioned with respect to a transverse or horizontal axis 32.

Referring to FIG. 2, a plurality of circumferentially spaced lugs 34 formed on the reflector 18 are adapted to seat against the front surface of the adjusting plate 14. An annular retaining ring 36 has an inwardly turned frontal rim 38 that engages the flange 24 of the lens 20. As shown in FIGS. 1 and 4, a plurality of L-shaped tabs 40 have one leg spot-welded to an inwardly facing surface of the retaining ring 36 and the other leg fixedly connected to the adjusting plate 14 by screws 42 to thereby securely clamp the headlamp 12 against the front surface of the adjusting plate 14.

The adjusting plate 14 includes an annular flange 44 having the aforementioned front seating surface and a rearwardly extending cylindrical rim 46 having a centrally disposed opening through which the reflector 18 extends. While not specifically shown, the flange 44 may include means for circumferentially orienting and retaining the lugs 34.

The housing 16 is generally rectangular and includes a vertical mounting surface 48 terminating with a forwardly extending peripheral rim 50. The surface 48 includes a plurality of mounting holes 52 for attaching the headlamp assembly 10 in a vertical plane 53 normal to a transverse horizontal axis of the vehicle. While the preferred embodiment utilizes a separate housing, it will be appreciated that the equivalent structure can be provided on a frontal body panel of the vehicle.

The headlamp 12 and the adjusting plate 14 are universally adjustably connected to the housing 16 by adjusting and supporting means generally comprising a pair of aiming screws 54 and 56 and a pivot pin 58. The aiming screws 54 and 56 are diametrically opposed with respect to the headlamp 12 and have axes lying in a longitudinal plane 60 inclined 45° relative to the transverse axis 32. As shown in FIG. 2, the aiming screws 54 and 56 are adjustably connected to the housing 16 by a plastic aiming nut 62 which, as shown in FIG. 5, is fixedly secured to the housing 16 by rivets 64. Shanks 66 extend through holes or slots formed in the flange 44 and are threaded through the aiming nut 62 until heads 68 engage the front surface of the adjusting plate 14. As shown in FIG. 1, the heads 68 include crossed slots for accommodating a suitably shaped aiming tool.

The pivot pin 58, as shown in FIG. 3, includes a base 70 fixedly connected to the housing 16 and a conical head 72 which universally supports the adjusting plate 14 at the edges of a hole 74. Referring to FIG. 1, the axis of the pivot pin 58 is horizontally aligned with the aiming screw 54 at a horizontal axis 76 and vertically aligned with the second aiming screw 56 at a vertical axis 78. A compression spring 80 is located diametrically opposite the pivot pin 58 in a longitudinal plane 82 normal to the plane 60 of the aiming screws 54 and 56. As shown in FIG. 3, the spring 80 is secured to the adjusting plate 14 by a fastener 84 and located on the housing 16 by a projection 86. In this connection, it will be appreciated that the place of attachment for the spring 80 and the pivot pin 58 can be reversed. The spring 80 is compressively held between the adjusting plate 14 and the housing 16 and serves to continuously urge the latter against the heads 68 of the aiming screws 54 and 56 and against the hole 74 of the pivot pin 58 to establish a three-point suspension system. In the preferred construction, the first aiming screw 54, the pivot pin 58, the second aiming screw 56, and the spring 80 are circumferentially spaced about the annular flange 44 in successive quadrants. However, it will be appreciated that other equivalent spacings and arrangements can be provided for these components.

To position the headlamp 12 in a vertical aiming plane, the second aiming screw 56 is selectively rotated thereby pivoting the adjusting plate 14 and the headlamp 12 about a horizontal axis 76 defined by the first aiming screw 54 and the pivot pin 58. To position the headlamp 12 in the proper horizontal aiming plane, the first air aiming screw 54 is selectively rotated thereby pivoting the adjusting plate 14 and the headlamp 12 about a vertical axis 78 defined by the pivot pin 58 and the second aiming screw 56. In other words, selective adjustment of the screws 54 and 56 will universally position the headlamp relative to the vehicle to provide proper horizontal and vertical aim for the headlamp system.

In the above-described construction, the adjusting plate 14 and the headlamp 12 are adjustably supported on the vehicle at three points—namely, the heads 68 of the aiming screws 54 and 56 and the hole 74 of the pivot pin 58. Therefore, the contact area at the points of suspension is minimal and, accordingly, offers extremely low resistance to adjustment. Moreover, the spring 80 in combination with the small contact areas eliminates the possibility that any binding will occur between the housing 16 and the adjusting plate 14 during the adjusting and aiming operation described above.

Although only one form of this invention has been shown and described, other forms will be readily apparent to those skilled in the art. Therefore, it is not intended to limit the scope of this invention by the embodiment selected for the purpose of this disclosure but only by the claims which follow.

We claim:

1. A headlamp assembly for a motor vehicle, comprising: an adjusting plate; a headlamp fixedly connected to the adjusting plate; a pair of aiming screws adjustably connected between said vehicle and said adjusting plate, said aiming screws being disposed on opposite sides of said headlamp in a longitudinal plane inclined 45° from a transverse horizontal axis of said vehicle; a pivot member connected between said vehicle and said adjusting plate, said pivot member being horizontally aligned with one of said aiming screws and vertically aligned with the other of said aiming screws; spring means retained between said vehicle and said adjusting plate for urging the latter into continuous engagement with portions of said aiming screws and said pivot member whereby said headlamp is positioned in a vertical aiming plane by selectively adjusting said other of said aiming screws and in a horizontal aiming plane by selective adjustment of said one of said aiming screws.

2. An adjustable motor vehicle headlamp assembly, comprising: an adjusting plate having an annular flange; a sealed beam headlamp fixedly mounted on the adjusting plate at the flange; a first aiming screw, a pivot pin, a second aiming screw, and a spring interposed between said vehicle and said adjusting plate and being circumferentially spaced in successive quadrants with respect to said flange, said aiming screws being disposed on opposite sides of said headlamp in a longitudinal plane inclined 45° from a transverse horizontal axis of the vehicle, said pivot pin and said spring being disposed on opposite sides of said headlamp in a longitudinal plane normal to said first-mentioned longitudinal plane whereby said headlamp is positioned in a vertical aiming plane by selectively rotating said second aiming screw to pivot said headlamp and adjusting plate about a horizontal axis defined by said first aiming screw and said pivot pin and in a horizontal aiming plane by selectively rotating said first aiming screw to pivot said headlamp and said adjusting plate about a vertical axis defined by said second aiming screw and said pivot pin.

3. An adjustable headlamp mounting for universally connecting a headlamp to a motor vehicle, comprising: an adjusting plate having an annular flange against which said headlamp is fixedly clamped; a first aiming screw, a pivot pin, a second aiming screw, and a spring circumferentially spaced in successive quadrants about said flange between said adjusting plate and said vehicle, said aiming screws being adjustably connected between said adjusting plate and said vehicle on opposite sides of said headlamp and lying in a plane inclined 45° from a transverse horizontal axis of said vehicle, said pivot pin being fixedly connected to the vehicle and having a universal pivot point at said flange that is horizontally aligned with said first aiming screw and vertically aligned with said second aiming screw, said spring being compressively retained between said vehicle and said flange and continuously urging the latter against portions of said aiming screws and said pivot point to establish an adjustable three-point suspension system for the headlamp whereby said headlamp is positioned in a vertical aiming plane by selectively rotating said second aiming screw to pivot said headlamp and adjusting plate about a horizontal axis defined by said first aiming screw and said pivot point and in a horizontal aiming plane by selectively rotating said first aiming screw to pivot said headlamp and said adjusting plate about a vertical axis defined by said second aiming screw and said pivot point.

4. An adjustable headlamp assembly for a motor vehicle, comprising: a housing adapted to be mounted in a vertical plane along a transverse horizontal axis of said vehicle; an adjusting plate having an annular flange; a sealed beam headlamp; an annular retaining ring peripherally engaging said headlamp and fixedly connected to said adjusting plate to clamp said headlamp against said flange; a first and a second aiming screw adjustably connected to said housing and having heads rotatably contacting said flange on opposite sides of said headlamp, said aiming screws lying in a longitudinal plane inclined 45° from said transverse horizontal axis of said vehicle; a pivot pin fixedly connected to the housing and having a conical head universally supporting said adjusting plate at a pivot point that is horizontally aligned with said first aiming screw and vertically aligned with said second aiming screw; a coiled spring compressively retained between said flange and said housing and continuously urging said flange against said heads of said aiming screws and said conical head of said pivot pin to establish a universally adjustable three-point suspension system for the headlamp, the arrangement being such that the headlamp is aimed in a horizontal plane by selectively rotating said first aiming screw to pivot said headlamp about a vertical axis defined by said second aiming screw and said conical head and in a vertical plane by selectively rotating the second aiming screw to pivot said headlamp about a horizontal axis defined by said first aiming screw and said conical head.